(12) United States Patent
Lee

(10) Patent No.: US 7,235,027 B2
(45) Date of Patent: Jun. 26, 2007

(54) AUTOMATIC TENSIONER FOR TIMING CHAIN

(75) Inventor: Jong-Sub Lee, Gyeonggi-do (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 111 days.

(21) Appl. No.: 10/750,672

(22) Filed: Dec. 31, 2003

(65) Prior Publication Data

US 2005/0085323 A1    Apr. 21, 2005

(30) Foreign Application Priority Data

Oct. 17, 2003    (KR) ............... 10-2003-0072520

(51) Int. Cl.
*F16H 7/08*    (2006.01)
(52) U.S. Cl. ..................................... 474/110
(58) Field of Classification Search ........... 474/101, 474/109, 110, 111; 123/193.2
See application file for complete search history.

(56) References Cited

U.S. PATENT DOCUMENTS

| | | | | |
|---|---|---|---|---|
| 5,030,169 A | * | 7/1991 | Kiso et al. ............... | 474/110 |
| 5,713,809 A | * | 2/1998 | Yamamoto et al. ......... | 474/110 |
| 5,913,742 A | * | 6/1999 | Nakamura et al. ......... | 474/110 |
| 5,954,159 A | * | 9/1999 | Nakamura ................. | 184/11.2 |
| 6,146,300 A | * | 11/2000 | Suzuki et al. ............ | 474/111 |
| 6,875,141 B2 | * | 4/2005 | Konishi et al. ........... | 474/109 |

FOREIGN PATENT DOCUMENTS

JP    09-032572    2/1997

* cited by examiner

*Primary Examiner*—Vicky A. Johnson
(74) *Attorney, Agent, or Firm*—Morgan Lewis & Bockius LLP

(57) ABSTRACT

The tensioner includes a cylinder inside a large capacity reservoir tank without interference with other components. The tensioner maintains oil inside the cylinder at all times, thereby improving the response of the tensioner when the engine is re-started after a long periods of inactivity. This prevents any fluctuation and wear and tear of a timing chain during engine re-start. Furthermore, the reservoir tank is integrally cast with the cylinder block to reduce manufacturing costs and increasing space-utilization of the engine.

9 Claims, 2 Drawing Sheets

AUTOMATIC TENSIONER FOR TIMING CHAIN

CROSS-REFERENCE TO RELATED APPLICATIONS

This application claims priority of Korean Application No. 10-2003-0072520, filed on Oct. 17, 2003, the disclosure of which is incorporated fully herein by reference.

FIELD OF THE INVENTION

The present invention relates to an automatic tensioner for a timing chain adapted to supply hydraulic pressure to a hydraulic tensioner to enable the engine timing chain to maintain a required constant tension.

BACKGROUND OF THE INVENTION

Generally, a hydraulic tensioner is activated by engine oil, thus when the ignition key is turned on, the oil supply system is required to quickly supply the operational fluid, engine oil, to the timing chain.

SUMMARY OF THE INVENTION

Embodiments of the present invention provide an automatic tensioner for a timing chain adapted to quickly supply hydraulic pressure of engine oil to a hydraulic tensioner when the engine is re-started after a long periods of inactivity, thereby stabilizing the operational state of a timing belt during the initial engine start.

In a preferred embodiment of the present invention, the automatic tensioner for a timing chain comprises a plunger inserted inside a cylinder for changing the tension of a timing chain by a linear sliding movement. An oil pump pumps oil from an oil pan and supplies it to the cylinder. A reservoir tank is formed to preserve oil between the oil pump and the cylinder.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
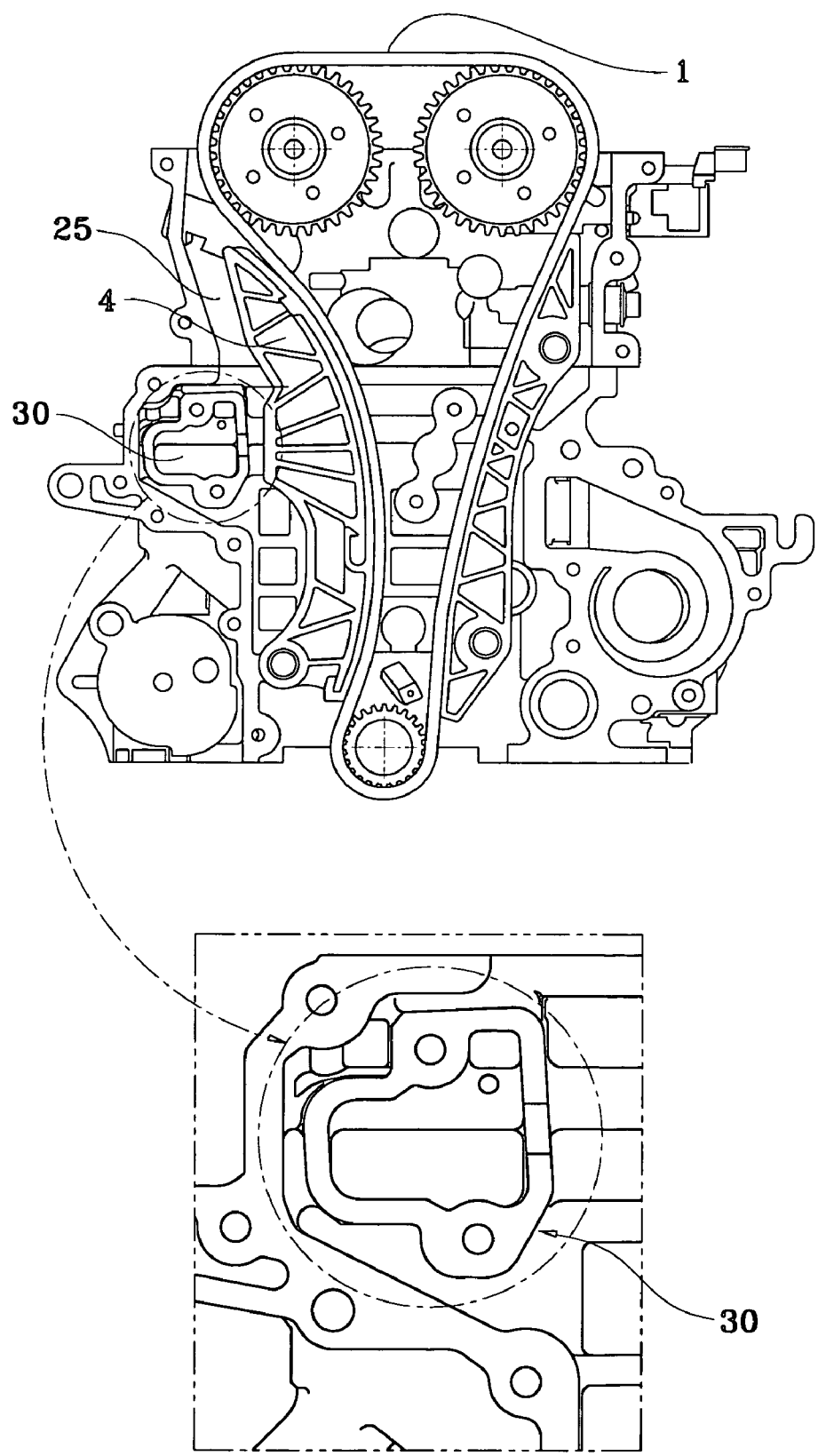
FIG. 1 is a side view illustrating a reservoir tank integrally formed at a cylinder block according to an embodiment of the present invention.
Figure 2:
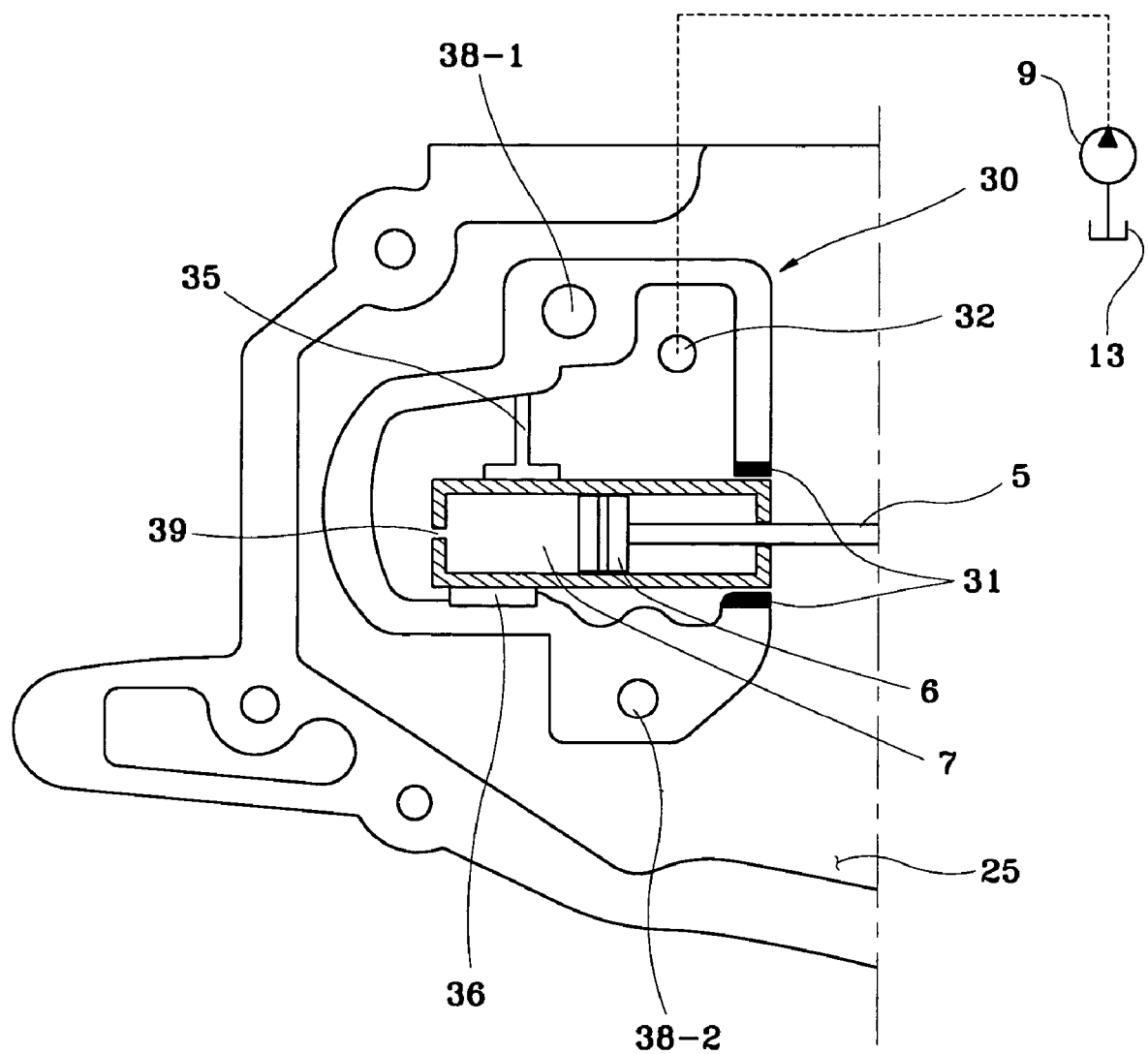
FIG. 2 illustrates a structure of an automatic tensioner for a timing chain according to an embodiment of the present invention.

As shown in FIGS. 1 and 2, an automatic tensioner for a timing chain comprises a reservoir tank 30 integrally formed at a cylinder block 25. A cylinder 7 is accommodated inside the reservoir tank 30.

The reservoir tank 30 prevents discharge of oil to an oil pan 13 and preserves the oil so that when the engine is re-started, the oil is immediately provided into the cylinder 7 from the reservoir tank 30. The reservoir tank 30 is cast integrally with the cylinder block 25. Therefore, no additional components are required.

The reservoir tank 30 also reduces oil supply time from the oil pan 13 to the cylinder 7 via an operation of an oil pump 9 during an engine re-start. This improves the response of the timing chain's automatic tensioner.

The reservoir tank 30, thus described, should have a larger capacity than the inner space of the cylinder 7. However, it is difficult to fit the reservoir tank 30 of a large-capacity into a conventional automatic tensioner structure for a timing chain. Accordingly, this embodiment of the present invention is configured to integrally cast the reservoir tank 30 with the cylinder block 25 and accommodate the cylinder 7 in the reservoir tank 30. This creates a reservoir tank 30 having a large capacity to occupy a compact space.

The cylinder 7 is fixed inside the reservoir tank 30 via upper and lower mounting members 35 and 36. The cylinder 7 mounting part of the reservoir tank 30 is sealed by a packing member 31 to prevent oil leakage. In addition, the cylinder 7 is formed with an oil hole 39 at an end thereof opposing a direction of plunger 6 insertion. The oil hole 39 allows oil influx and efflux into the reservoir tank 30.

As the oil enters or exits from the cylinder 7, the plunger 6 moves back and forth, thus a rod 5 affixed to the plunger 6 pushes a tensioner arm 4, for adjusting the tension of a timing chain 1. The tensioner arm 4 is fixed via a hinge to the cylinder block.

The reservoir tank 30 is also formed with an oil supply hole 32 at an upper portion thereof. This oil supply hole 32 is connected to the oil pump 9 and oil pan 13. The oil supply hole 32 is preferably located higher than the cylinder 7 to fill up the cylinder 7 at all times with the oil stored in the reservoir tank 30, and improve the response of oil provided to the cylinder 7.

In order to prevent inverse oil flow, some conventional structures are formed with a check valve or the like. However, when the engine has been inactive for a long period of time in conventional automatic tensioners, most of the oil draines out from the cylinder 7. The embodiment of the present invention, therefore, is configured to provide a reservoir tank 30 with a large-capacity, and to place the cylinder 7 lower than the oil supply hole 32 of the reservoir tank 30 so as to store most of the oil inside the cylinder 7 even when the engine has been inactive for a long time period.

The assembly method of the automatic tensioner for a timing chain constructed above will now be described below.

After the cylinder 7 is provided at a lower side of the reservoir tank 30, the cylinder 7 is fixed inside the reservoir tank 30 via the upper and lower mounting members 35 and 36. The packing member 31 is inserted into the cylinder 7 mounting part of the reservoir tank 30 to seal it. A reservoir tank cover (not shown) covers the upper portion of the reservoir tank 30. Bolts are inserted into coupling holes 38-1 and 38-2 to complete the assembly of the automatic tensioner for the timing chain. Furthermore, it is preferable to insert a proper packing member between the reservoir tank 30 and the reservoir tank cover for preventing oil leakage. The rest of the structure of the assembly according to the embodiment of the present invention is omitted in that it is similar to that of the conventional automatic tensioners for hydraulic timing chains.

The operation of the present invention constructed above will now be described with reference to FIG. 2.

As shown in FIG. 2, the oil supply hole 32 of the reservoir 30 is disposed higher than the cylinder 7 in order for the cylinder 7 to be filled with oil at all times. Thus, even if the engine is inactive for a long time period and is then re-started, the cylinder 7 is filled up with oil without any retardation, and hydraulic pressure is immediately applied to the cylinder 7. This prevents any fluctuation of the timing chain during an initial engine start.

As is apparent from the foregoing, there is an advantage in the present invention in that the automatic tensioner for a timing chain is configured to maintain oil in the cylinder at all times by installing a reservoir tank of a large capacity. This improves the response of the tensioner when the engine is re-started after a long periods of inactivity. This also prevents fluctuation and wear of the chain during the initial engine start. There is another advantage in that the reservoir tank is integrally cast with the cylinder block to reduce manufacturing costs and efficiently utilize the engine space. There is further another advantage in that the cylinder is provided inside the reservoir tank of a large capacity, thereby preventing interference with other components.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Also, any figures or graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What is claimed is:

1. An automatic tensioner for a timing chain, comprising:
    a plunger inserted inside a cylinder for changing the tension of a timing chain by a linear sliding movement;
    an oil pump pumping and supplying oil from an oil pan to said cylinder; and
    a reservoir tank for preserving oil between said oil pump and said cylinder;
    wherein said reservoir tank is integrally formed with a cylinder block, and said cylinder is accommodated inside said reservoir tank.

2. The tensioner as defined in claim 1, wherein an oil supply hole formed at said reservoir tank is installed higher than said cylinder.

3. The tensioner as defined in claim 1, wherein said cylinder is formed with an oil hole at an end in an opposing direction from said plunger's insertion for connecting with said reservoir tank.

4. The tensioner as defined in claim 1, wherein the reservoir tank is integrally cast as a hole in the cylinder block.

5. An automatic tensioner for a timing chain, comprising:
    a cylinder;
    a plunger within said cylinder, where said plunger is configured to be attached to a tensioner arm configured to change tension of a timing chain; and
    a reservoir tank for supplying oil to said cylinder;
    wherein said reservoir tank is integrally formed with a cylinder block, and said cylinder is provided inside said reservoir tank.

6. The tensioner as defined in claim 5, wherein an oil supply hole formed at said reservoir tank is installed higher than said cylinder.

7. The tensioner as defined in claim 5, wherein said cylinder is formed with an oil hole at one end opposing a direction of said plunger's insertion within said cylinder, where said oil hole is configured to connect with said reservoir tank.

8. The tensioner as defined in claim 5, further comprising an oil pump coupled to said reservoir tank and configured to pump oil from an oil pan to said cylinder.

9. The tensioner as defined in claim 5, wherein the reservoir tank is integrally cast as a hole in the cylinder block.

* * * * *